United States Patent
Polzin et al.

(10) Patent No.: US 8,959,846 B2
(45) Date of Patent: Feb. 24, 2015

(54) GRANULAR MATERIAL STORAGE CAPACITY INCREASING DEVICE AND SYSTEM

(76) Inventors: Keith Polzin, Tea, SD (US); Mike Snoozy, Brandon, SD (US); Lucas Lorenzen, Sioux Falls, SD (US); Chad Kramer, Sioux Falls, SD (US)

( * ) Notice: Subject to any disclaimer, the term of this patent is extended or adjusted under 35 U.S.C. 154(b) by 165 days.

(21) Appl. No.: 13/465,652

(22) Filed: May 7, 2012

(65) Prior Publication Data

US 2013/0291458 A1  Nov. 7, 2013

(51) Int. Cl.
*E04B 7/10* (2006.01)

(52) U.S. Cl.
USPC ........... 52/80.2; 52/86; 52/506.05; 52/506.06

(58) Field of Classification Search
CPC ........ E04B 1/38; E04H 2007/225; E04H 7/22
USPC ......... 52/80.1, 80.2, 86, 192, 506.05, 506.06; 248/58, 62, 74.1, 74.2, 74.4
See application file for complete search history.

(56) References Cited

U.S. PATENT DOCUMENTS

| | | | | |
|---|---|---|---|---|
| 1,733,004 A | * | 10/1929 | Bower | 52/745.07 |
| 2,693,195 A | * | 11/1954 | Frieder et al. | 135/122 |
| 4,364,205 A | * | 12/1982 | Scott | 52/4 |
| 4,372,017 A | * | 2/1983 | Heckethorn | 24/277 |
| 4,841,693 A | * | 6/1989 | Welsh | 52/197 |
| 5,165,628 A | * | 11/1992 | Todd et al. | 248/62 |
| 6,233,476 B1 | | 5/2001 | Strommer et al. | |
| 6,240,694 B1 | * | 6/2001 | Castano | 52/653.1 |
| 6,308,384 B1 | * | 10/2001 | Normal et al. | 24/277 |
| 7,654,048 B2 | * | 2/2010 | Hanig et al. | 52/248 |
| 7,814,714 B2 | * | 10/2010 | McGary | 52/192 |
| 7,845,597 B2 | * | 12/2010 | Gatta | 248/58 |
| 2010/0083593 A1 | * | 4/2010 | Owen | 52/192 |

* cited by examiner

*Primary Examiner* — Brian Glessner
*Assistant Examiner* — Adam Barlow

(57) ABSTRACT

A granular material storage capacity increasing device and system includes a housing including a first and second side walls each having an upper edge. A roof structure is attached to and extends between the first and second side walls. The roof structure includes roof trusses each having an inner chord. A plurality of curtain assemblies is attached to the roof structure to define an auxiliary storage capacity. At least one of the curtain assemblies is mounted adjacent to and associated with the first side wall and at least one of the curtain assemblies is mounted adjacent to and associated with the second side wall. Each of the curtain assemblies a flexible panel extending between and is attached to two inner chords. A top edge attached to the inner chords and bottom edge attached to one of the first or second side walls.

3 Claims, 8 Drawing Sheets

GRANULAR MATERIAL STORAGE CAPACITY INCREASING DEVICE AND SYSTEM

BACKGROUND OF THE DISCLOSURE

Field of the Disclosure

The disclosure relates to grain storage assemblies and more particularly pertains to a new grain storage assembly for allowing an increase in an effective storage volume of a grain storage housing.

SUMMARY OF THE DISCLOSURE

An embodiment of the disclosure meets the needs presented above by generally comprising a housing including a first side wall and a second side wall. Each of the first and second side walls engage and extend upwardly from a ground surface. The first and second side walls are vertically oriented and each has an upper edge. A roof structure is attached to and extends between the first and second side walls. The roof structure engages the upper edges of the first and second side walls and includes a plurality of roof trusses that are spaced from each other. Each of the roof trusses includes an inner chord. A plurality of curtain assemblies is attached to the roof structure to define an auxiliary storage capacity above the first and second side walls and supported by the roof structure. At least one of the curtain assemblies is mounted adjacent to and associated with the first side wall and at least one of the curtain assemblies is mounted adjacent to and associated with the second side wall. Each of the curtain assemblies at least includes a pair of the inner chords laterally spaced from each other and defining a first inner chord and a second inner chord. A flexible panel extends between and is attached to the first and second inner chords. The panel has a top edge and a bottom edge. The top edge is attached to the inner chords while the bottom edge is positioned below the upper edge of and attached to an associated one of the first or second side walls.

Another embodiment of the disclosure includes a mounting device for mounting a flexible panel on a housing of a grain storage system. The mounting device is configured to mount elongated members on inner chords of the housing such that a flexible panel may be positioned on the elongated members to define an auxiliary storage capacity. The mounting device comprises a plurality of brackets configured to be mounted on a single inner chord of a housing such that the brackets are vertically spaced from each other. Each of the brackets includes a plate having a first side, a second side, a first edge and a second edge wherein the first and second edges are positioned opposite of each other. The first side is abuttable and securable to the inner chord such that the first edge extends inwardly of the housing. The first edge has a notch therein configured to receive an elongated member. A length dimension is defined between the second edge and the notch. The brackets positioned on the inner chord include brackets having different ones of the length dimensions such that a panel mounted to the inner chord by the brackets is non parallel to the inner chord.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
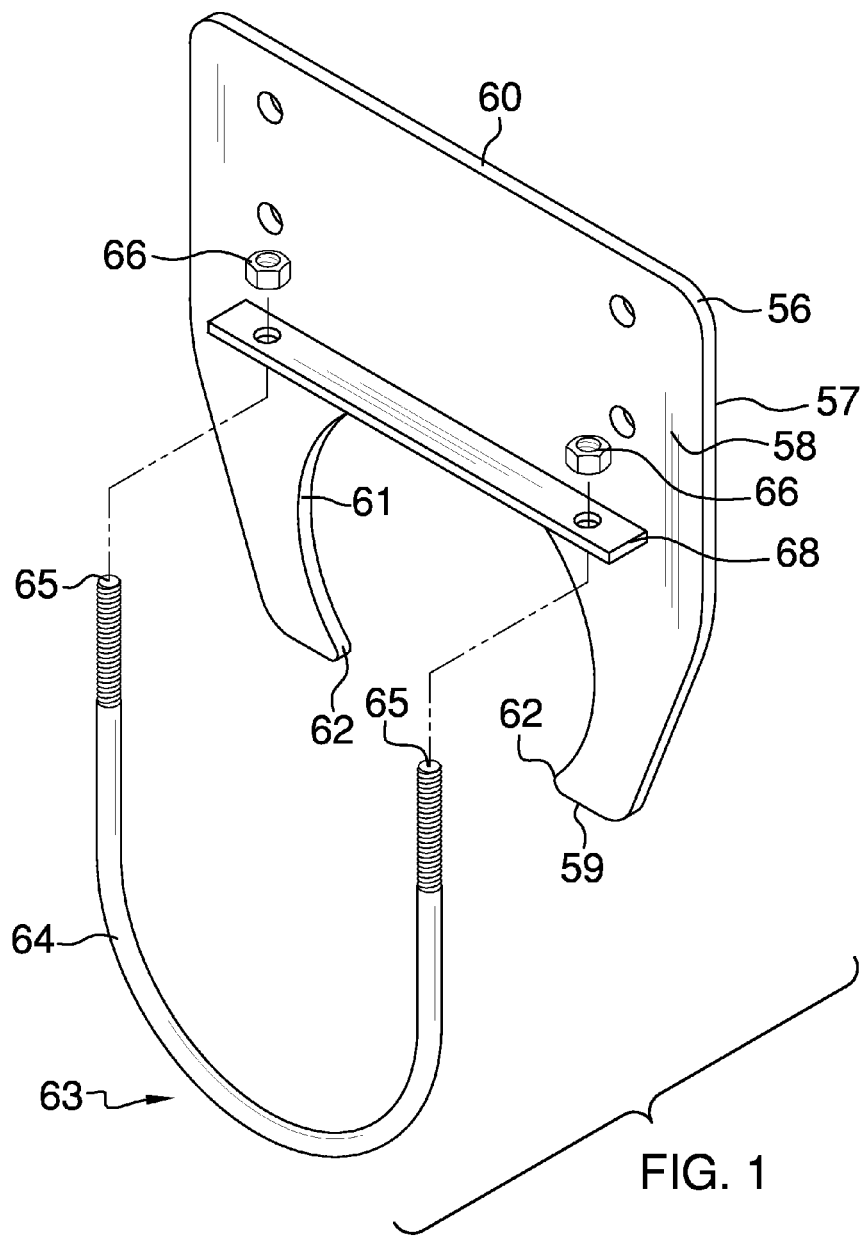
FIG. 1 is a perspective view of a bracket of a granular material storage capacity increasing device and system according to an embodiment of the disclosure.
Figure 2:
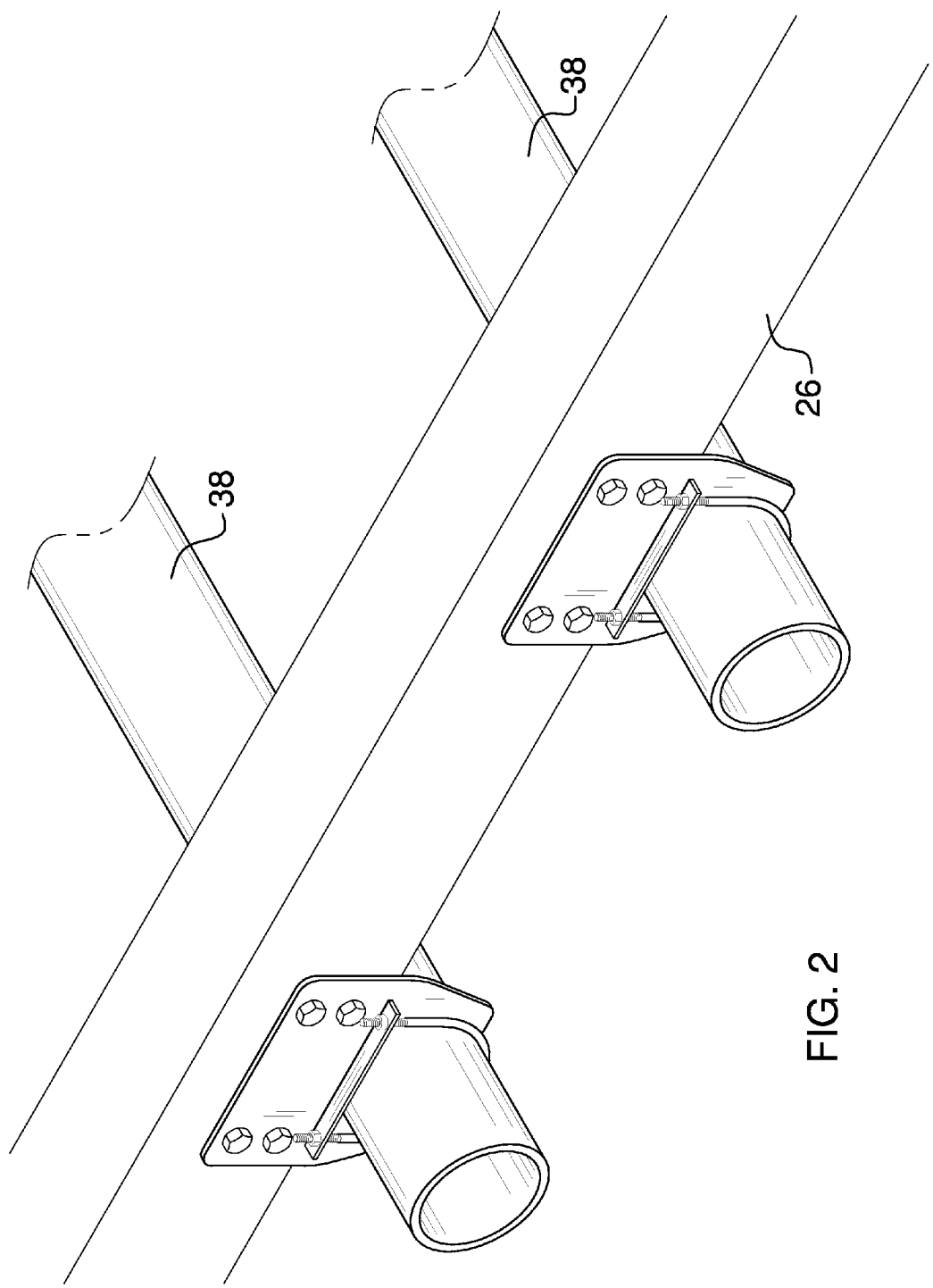
FIG. 2 is a perspective view of an embodiment of the disclosure.
Figure 3:
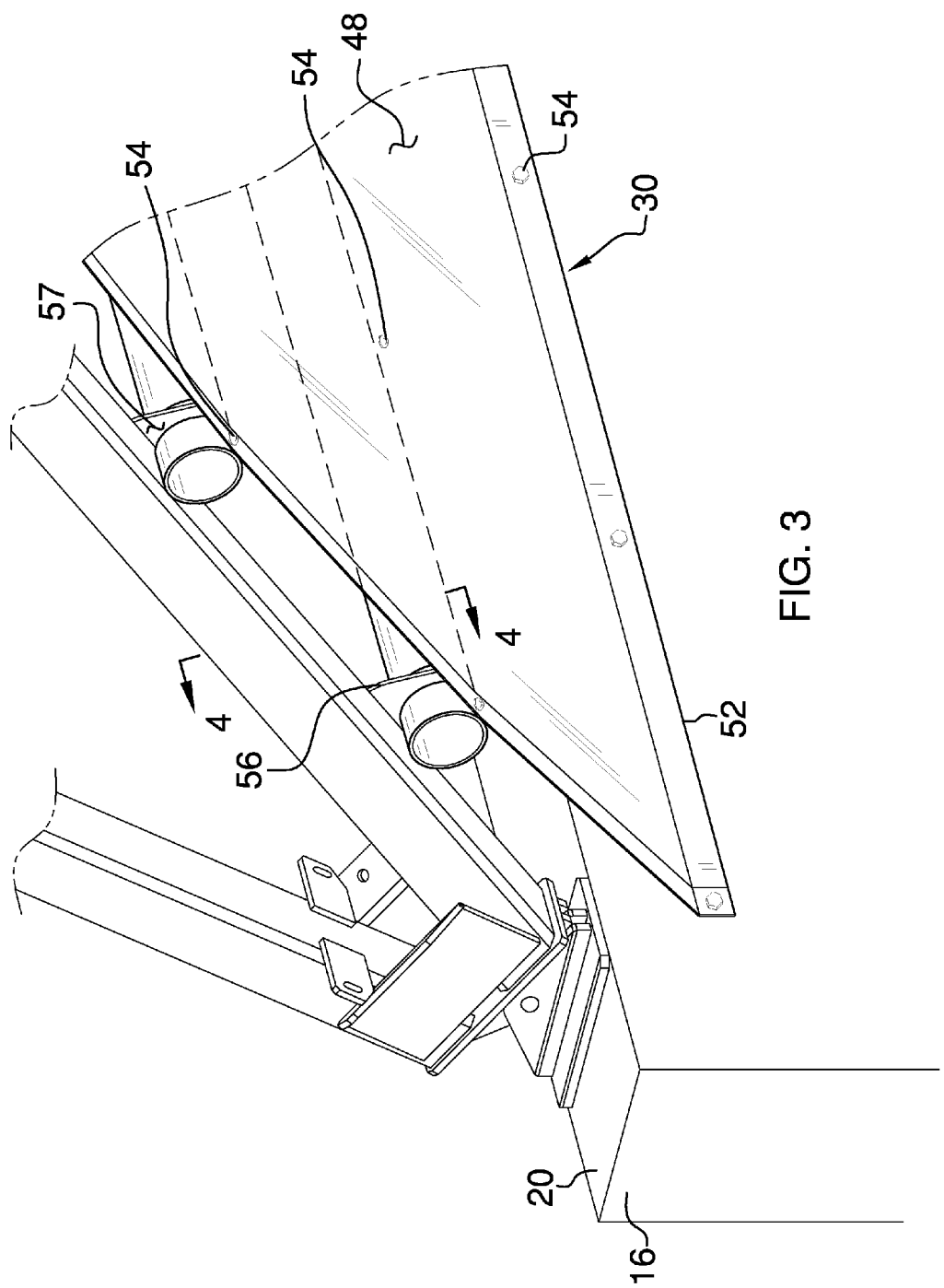
FIG. 3 is a perspective view of an embodiment of the disclosure.
Figure 4:
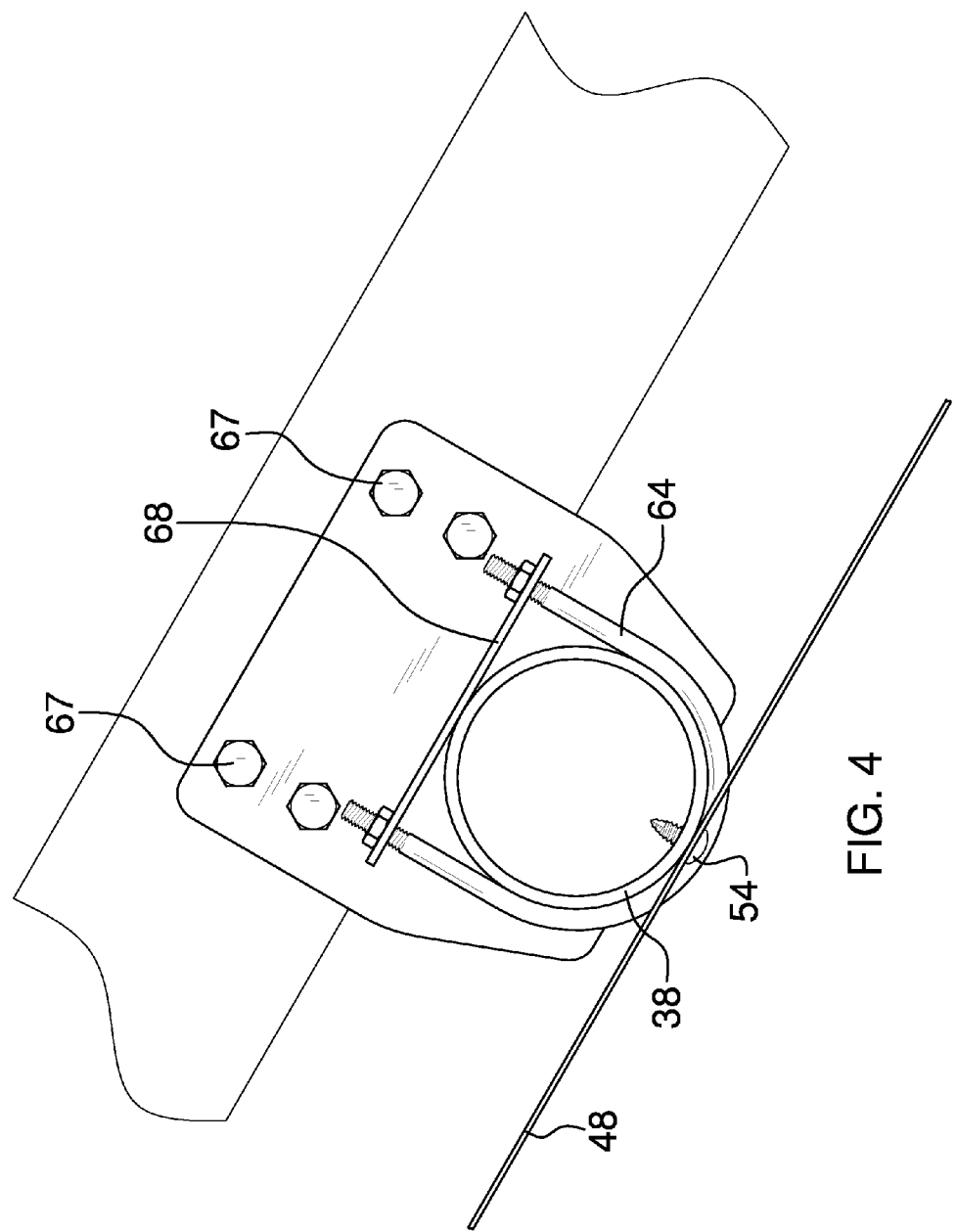
FIG. 4 is a side view of an embodiment of the disclosure.

With reference now to the drawings, and in particular to FIGS. 1 through 8 thereof, a new grain storage assembly embodying the principles and concepts of an embodiment of the disclosure and generally designated by the reference numeral 10 will be described.

As best illustrated in FIGS. 1 through 8, the granular material storage capacity increasing device and system 10 generally comprises a housing 12 including a first side wall 16 and a second side wall 18. Each of the first 16 and second 18 side walls engages and extends upwardly from a ground surface and each of the first and second side walls is vertically oriented and has an upper edge 20. A roof structure 22 is attached to and extends between the first 16 and second 18 side walls. The roof structure 22 engages the upper edges 20 of the first 16 and second 18 side walls. More particularly, the roof structure 22 includes a plurality of roof trusses 24 wherein each of the roof trusses 24 including an inner chord 26. The roof trusses 24 are spaced from each other. It should be understood that the housing 12 will further include a pair of end walls, not shown, extending between the first 16 and second 18 side walls to form a base wall having a generally rectangular configuration. The roof structure 22 includes inner 26 and outer chords 28 attached together by supports 30 and the trusses 24 may more particularly define hoop trusses. The housing 12 is of conventional nature and a similar structure is disclosed by U.S. Pat. No. 7,814,714, incorporated herein by reference. The instant assembly 10 may include roof trusses 24 including leg sections 32 and expanse 34 sections wherein the leg sections 32 abut and engage the first 16 and second 16 side walls.

A plurality of curtain assemblies 36 is attached to the roof structure 22 and first 16 and second 18 side walls to define an auxiliary storage capacity above the first 16 and second 18 side walls and supported by the roof structure 22 and first 16 and second 18 side walls. As is well known in the art, granular material, when stored, is often limited to the angle of repose of the granular material. This angle is dictated by the coefficient of fiction between the particles of the granular material being stored. The granular material may include grain, road salt, sand and the like and each has an angle of repose which limits the height to which it may be piled. Moreover, there are classifications within each category that again must be taken into consideration. Thus, within grain it is known that barley has an angle of repose of 30° while that of wheat is 28°. When filling a conventional storage housing the granular material cannot be piled so high as to rise above the base wall, which includes the first 16 and second 18 side walls, of the housing 12 which would cause the grain to push against an outer covering positioned on the outer chords 32. Thus, the height limit of the pile must be monitored to ensure that the height and the angle of repose do not combine to spill grain over the base wall. The curtain assemblies 36 are added to the housing 12 to allow the height of the pile to be increased above the base wall which, in turn, increases the overall granular material storage capacity of the housing 12.

Figure 5:
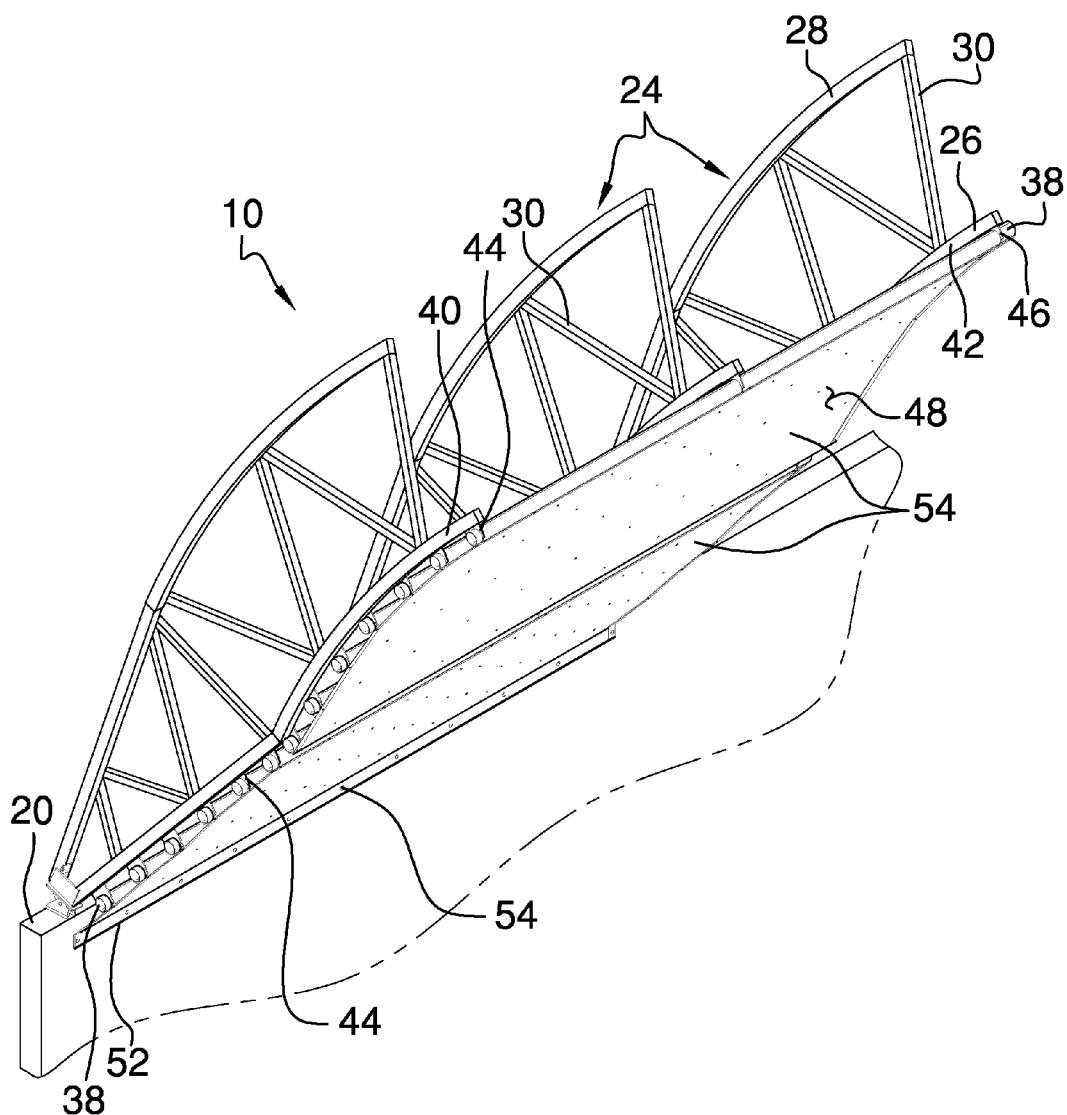
FIG. 5 is a perspective view of an embodiment of the disclosure.
Figure 6:
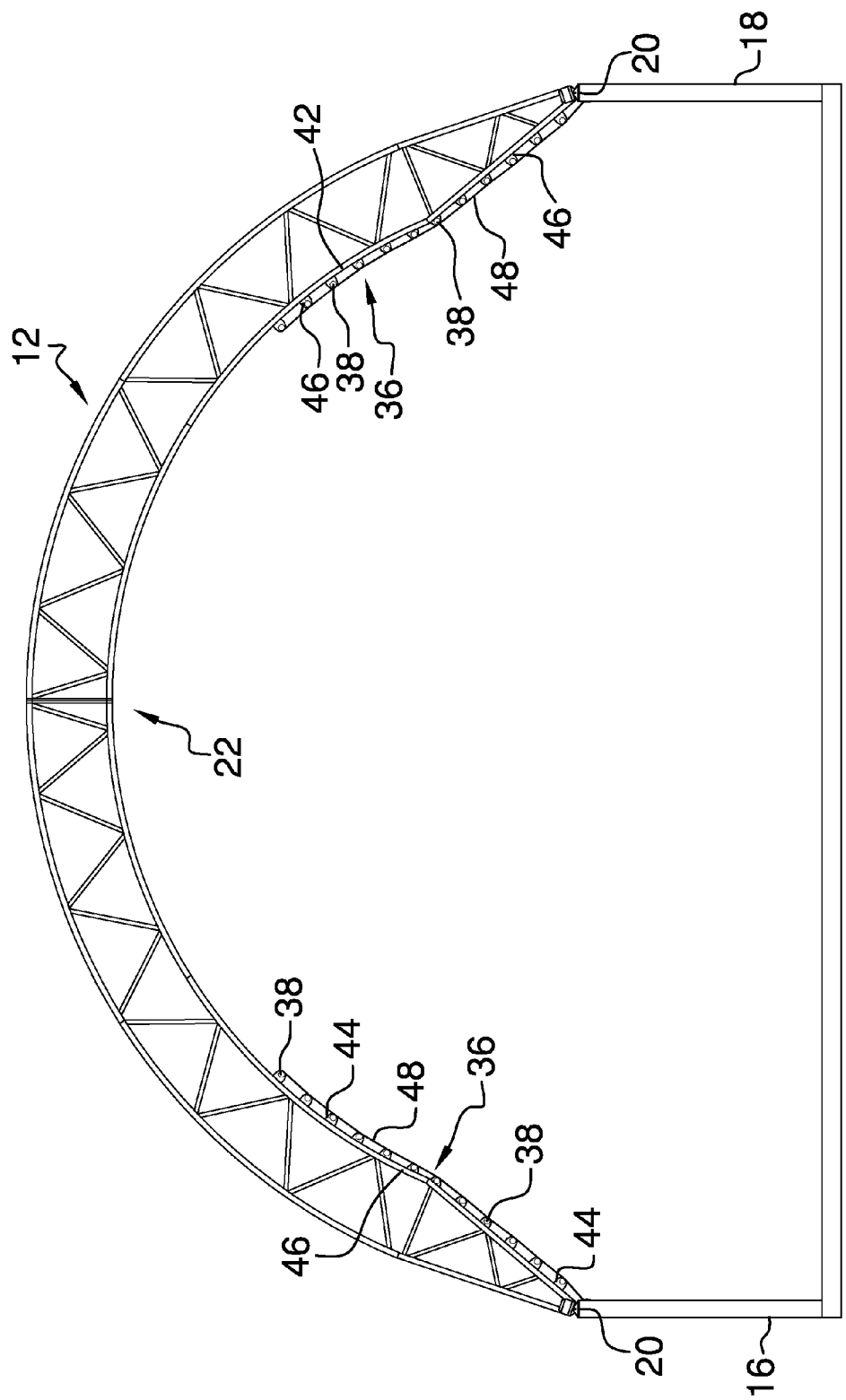
FIG. 6 is a side view of an embodiment of the disclosure.

At least one of the curtain assemblies 36 is mounted adjacent to and associated with the first side wall 16 and at least one of the curtain assemblies 36 is mounted adjacent to and associated with the second side wall 18. Each of the curtain assemblies 36 at least includes a plurality of elongated members 38. The elongated members 38 are rigid and may be of any useful length and extend between a pair of the inner chords 26 which are laterally spaced from each other. For clarification purposes, the pair of inner chords 26 will define a first inner chord 40 and a second inner chord 42. A plurality of first brackets 44 and a plurality of second brackets 46 are provided. The first brackets 44 are each mounted on the first inner chord 40 while each of the second brackets 46 are mounted on the second inner chord 42. The first brackets 44 are each horizontally aligned with one of the second brackets 46 to define a bracket set including one first bracket 44 and one second bracket 46. Thus, though only one second bracket 46 can be seen in FIG. 5, a view of this structure from the opposite view would be a mirror image of FIG. 5. Each bracket set receives one of the elongated members 38 so that each of the elongated members 38 is vertically spaced from each other and oriented parallel to each other. As can be seen in FIG. 5, the set may include more than two horizontally aligned brackets. FIG. 5 shows each set including three brackets though more brackets may be included as needed depending on the spacing of the inner chords 26 and the length of the elongated members 38.

The curtain assemblies 36 each further include a flexible panel 48 extending between and being attached to the first 40 and second 42 inner chords. More particularly, the panel 48 is attached to each of the elongated members 38. The panel 48 has a top edge 50 and a bottom edge 52. The top edge 50 is attached to an uppermost one of the elongated members 38 and is spaced from an apex of the roof structure 22. Generally, the panel 48 will extend less than 60% of a distance from the first 16 or second 18 side walls to the apex. The bottom edge 52 is positioned below the upper edge 20 of and attached to an associated one of the first 16 or second 18 side walls. The panel 48 may be attached to the first 16 and second 18 side walls and to the elongated members 38 with conventional fasteners 54 including bolts, rivets and the like. It is also contemplated that the area of the panel 48 adjacent to the bottom edge 52 may be adhered to the associated first 16 or second 18 side wall with an adhesive.

The panel 48 has a modulus of elasticity to ensure that it will not stretch significantly to cause the panel 48 to move between the roof trusses 24 and abut, and possibly tear, the outer covering of the housing 12. As the outer covering, which is not shown, is designed to keep the elements out, as opposed to retaining materials within the housing 12, and it is important that the modulus of elasticity is high enough to counter the force of the granular material upon the panel 48. This attribute may depend on the granular material being stored as the weight of the granular material, as well as its angle of repose, must be taken into consideration. However, it has been found that the assembly may benefit from a modulus of elasticity between 75 ksi and 90 ksi (wherein ksi is defined as kilopound per square inch).

The brackets 44, 46 of the assembly 10 include a plate 56 having a first side 57, a second side 58, a first edge 59 and a second edge 60 wherein the first 59 and second 60 edges are positioned opposite of each other. The first side 57 abuts and is secured to one of the first 40 or second 42 inner chords with couplers 67 so that the first edge 59 extends inwardly of the housing 12. The first edge 59 has a notch 61 therein to receive one of the elongated members 38. The notch 61 may be arcuately shaped to better accommodate cylindrically shaped elongated members 38. The notch 61 may further terminate in lips 62 to facilitate retention of the elongated members 38 in the notch 61.

Though not required to operate, the brackets 44, 46 of the assembly 36 may an elongated member 38 retention device may be included which comprises a flange 68 attached to and extending outwardly from the second side 58 and a stop 63 is attached to the flange 68 to retain the elongated member 38 in the notch 61 by forming a closed loop with the notch 61 around the elongated member 38. More particularly, the stop 63 prevents lateral sliding of the elongated members 38. The stop 63 may include a U-bolt 64 having a pair of ends 65 being removably extended through the flange 68. A pair of fasteners 66 engages the bolt 64 to retain the bolt 64 on the flange 68.

Figure 7:
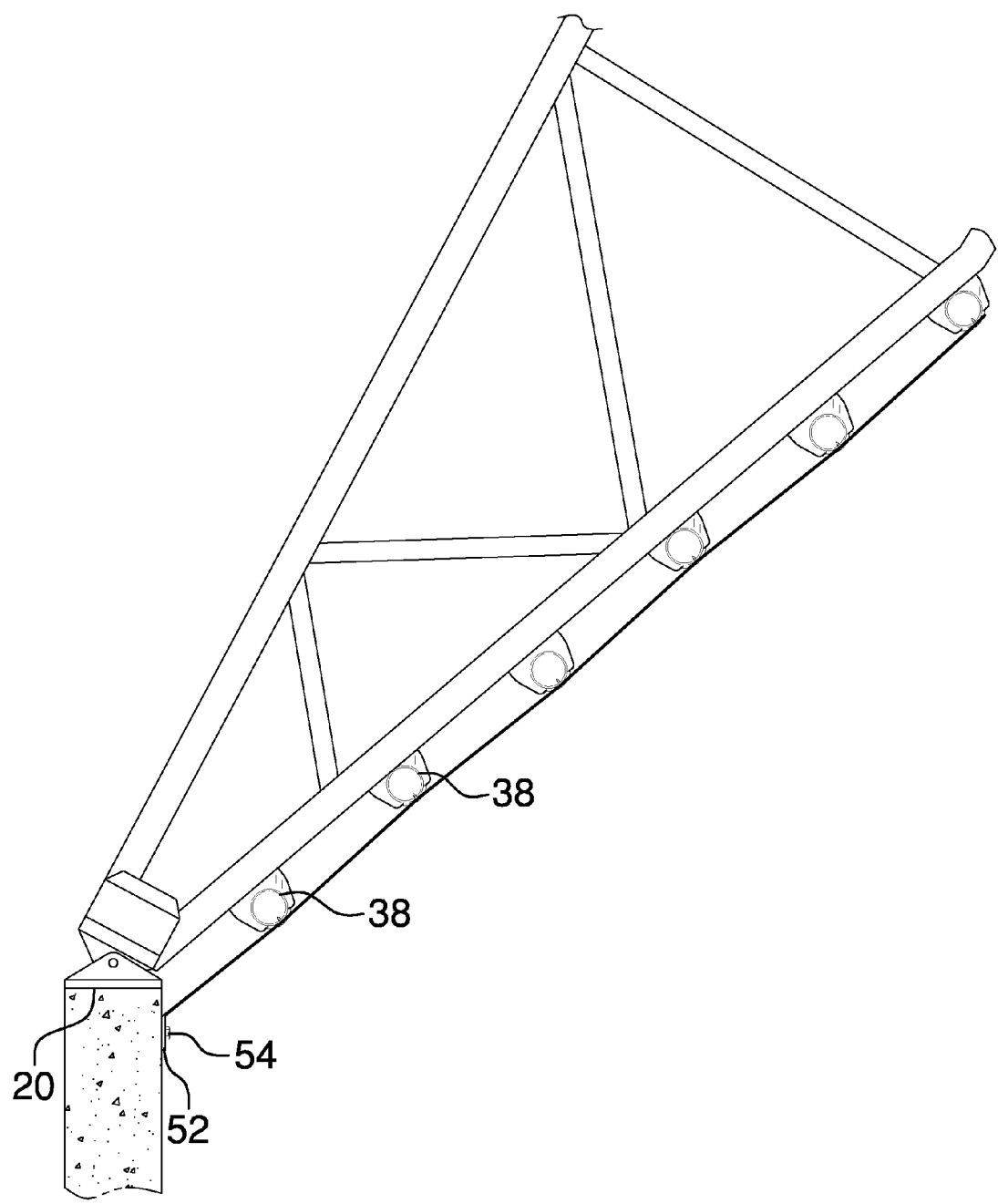
FIG. 7 is a side view of an embodiment of the disclosure.
Figure 8:
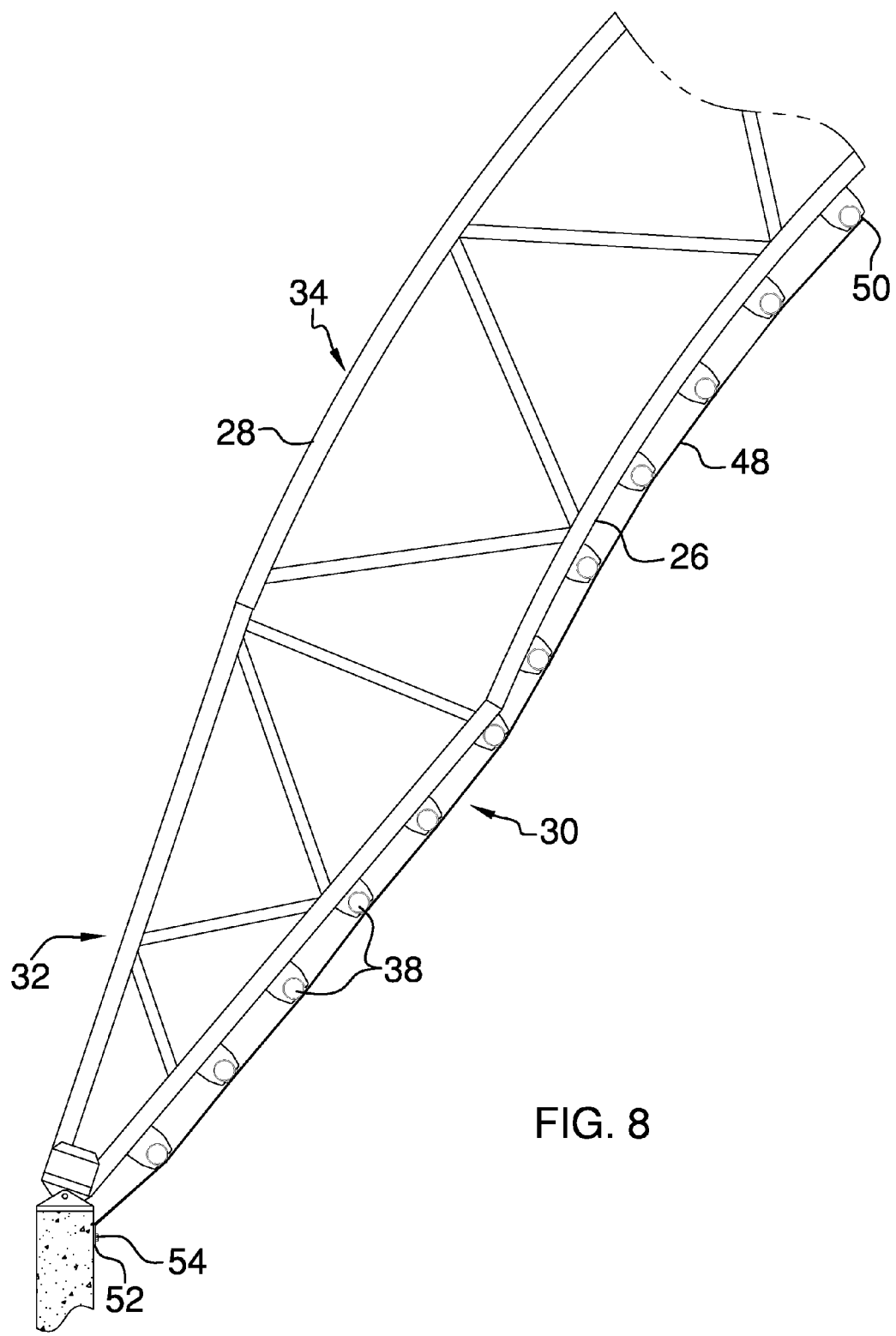
FIG. 8 is a side view of an embodiment of the disclosure.

A length dimension is defined between the second edge 60 and the notch 61 and determines how far into the housing 12 the notch 61 will therefore extend. The brackets 44 or 46 positioned on a same one of the first 40 or second 42 inner chords includes brackets having different ones of the length dimensions such that the panel 38 is non-parallel to the first 40 and second 42 inner chords. This ability to alter the positioning of the elongated members 38 relative to the inner chords 26 allows the user to modify the angle of the panel 12 to deflect the granular material at a selected angle away from the roof structure 22. By altering this angle, the user can control the amount of pressure being placed on the panel 38 and thereby not be restricted to the slope or curvature of the roof trusses 24 which will likely be arcuate. FIG. 7 demonstrates a staggered configuration whereas FIG. 8 shows a gradual increasing and then decreasing of the length dimensions to form a more continuous slope. The altering of this distance along with the attachment of the panel 38 to the first 16 or second 18 side walls provides for a more robust structure having less tendency to stretch or tear. Generally, the plates 56 will be attached to the inner chord 26 such that the notch 61 at least clears the inner chord 26. Thus, the space between a notch 61 and an inner chord 26 may be less than 0.40 inches. This distance may be increased over 0.50 inches or greater as needed to place the notch 61 in a beneficial location. Generally then, chord adjacent notches 61 are those that are 0.40 inches or less away from the inner chord 26 whereas spaced notches 61 are those that are greater than 0.50 inches away from the inner chord 26 and which may be positioned up to 12.0 inches from the inner chord 26.

Additionally, the vertical spacing of the brackets 44, 46 may be altered as needed depending on the force applied to the panel 48. For instance, it may be beneficial to more closely space together the elongated members nearer to the first 16 and second 18 side walls than the elongated members 38 nearer to the apex of the housing 12 as the forces will typically be greater on the panel 48 the nearer one moves towards the first 16 and second 18 lateral walls. Typically the distance between the elongated members 38 may be 1.5 feet and 4.0 feet.

In use, the curtain assemblies 36 are attached along the inner chords 26, using as many curtain assemblies 36 as required to cover the interior sides of the roof structure 22 along the first 16 and second 18 side walls. The brackets 44, 46 are selected depending on the angle of repose, the strength of the roof structure 22 and the modulus of elasticity of the panel 48 to ensure that the panel 48 will withstand the gravitational forces of the granular material on the panel 48. Once the curtain assemblies 36 are in place, the granular material is poured into the housing 12 in a conventional manner. As the granular material reaches heights along its edges greater than the height of the first 16, 18 and second lateral walls, the curtain assemblies 36 support the granular material and thereby increase the holding capacity of the housing 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A grain storage system comprising:
   a housing including;
      a first side wall and a second side wall, each of said first and second side walls engaging and extending upwardly from a ground surface, each of said first and second side walls being vertically oriented and having an upper edge;
      a roof structure being attached to and extending between said first and second side walls, said roof structure engaging said upper edges of said first and second side walls, said roof structure including a plurality of roof trusses, each of said roof trusses including an inner chord, said roof trusses being spaced from each other;
   a plurality of curtain assemblies being attached to said roof structure to define an auxiliary storage capacity above said first and second side walls and supported by said roof structure, at least one of said curtain assemblies being mounted adjacent to and associated with said first side wall and at least one of said curtain assemblies being mounted adjacent to and associated with said second side wall, each of said curtain assemblies at least including;
      a pair of said inner chords laterally spaced from each other and defining a first inner chord and a second inner chord;
      a flexible panel extending between and being attached to said first and second inner chords, said panel having a top edge and a bottom edge, said top edge being attached to said inner chords, said bottom edge being positioned below said upper edge of and attached to an associated one of said first or second side walls;
      a plurality of first brackets and a plurality of second brackets, each of said first brackets being mounted on said first inner chord and each of said second brackets being mounted on said second inner chord, each of said first brackets being horizontally aligned with one of said second brackets to define a bracket set, said brackets including brackets of different lengths extending away from said first and second chords such that said panel is non-parallel to said inner chords;
      a plurality of elongated members, each bracket set engaging and retaining one of said elongated members to said first and second inner chords;
      wherein each of said brackets includes:
         a plate having a first side, a second side, a first edge and a second edge wherein said first and second edges are positioned opposite of each other, said first side abutting and being secured to one of said inner chords such that said first edge extends inwardly of said housing, said first edge having a notch therein to receive one of said elongated members, wherein a length dimension is defined between said second edge and said notch, said brackets positioned on a same one of said inner chords including brackets having different ones of said length dimensions;
         a flange being attached to and extending outwardly from said second side; and
         a stop being attached to said flange to retain said elongated member in said notch.

2. A grain storage system comprising:
   a housing including;
      a first side wall and a second side wall, each of said first and second side walls engaging and extending upwardly from a ground surface, each of said first and second side walls being vertically oriented and having an upper edge;
      a roof structure being attached to and extending between said first and second side walls, said roof structure engaging said upper edges of said first and second side wall, said roof structure including a plurality of roof trusses, each of said roof trusses including an inner chord, said roof trusses being spaced from each other;
   a plurality of curtain assemblies being attached to said roof structure to define an auxiliary storage capacity above said first and second side walls and supported by said roof structure, at least one of said curtain assemblies being mounted adjacent to and associated with said first side wall and at least one of said curtain assemblies being mounted adjacent to and associated with said second side wall, each of said curtain assemblies at least including;
      a plurality of elongated members;
      a pair of said inner chords laterally spaced from each other and defining a first inner chord and a second inner chord;
      a plurality of first brackets and a plurality of second brackets, each of said first brackets being mounted on said first inner chord and each of said second brackets being mounted on said second inner chord, each of said first brackets being horizontally aligned with one of said second brackets to define a bracket set;
      each bracket set receiving one of said elongated members such that each of said elongated members is vertically spaced from each other and oriented parallel to each other;

a flexible panel extending between and being attached to said first and second inner chords, said panel being attached to each of said elongated members, said panel having a top edge and a bottom edge, said top edge being attached to an uppermost one of said elongated members, said bottom edge being positioned below said upper edge of and attached to an associated one of said first or second side walls;

each of said brackets including;
   a plate having a first side, a second side, a first edge and a second edge wherein said first and second edges are positioned opposite of each other, said first side abutting and being secured to one of said inner chords such that said first edge extends inwardly of said housing, said first edge having a notch therein to receive one of said elongated members, wherein a length dimension is defined between said second edge and said notch; and wherein said brackets positioned on a same one of said first or second inner chords includes brackets having different ones of said length dimensions such that said panel is non-parallel to said first and second inner chords.

3. The system according to claim 2, wherein each of said brackets includes:
   a plate having a first side, a second side, a first edge and a second edge wherein said first and second edges are positioned opposite of each other, said first side abutting and being secured to one of said first or second inner chords such that said first edge extends inwardly of said housing, said first edge having a notch therein to receive one of said elongated members;
   a flange being attached to and extending outwardly from said second side; and
   a stop being attached to said flange to retain said elongated member in said notch.

* * * * *